(12) United States Patent
Merlo et al.

(10) Patent No.: US 11,391,039 B2
(45) Date of Patent: Jul. 19, 2022

(54) MULTILAYERED PANEL FOR MACHINERY ENCLOSURE

(71) Applicant: Nuovo Pignone Technologie Srl, Florence (IT)

(72) Inventors: Roberto Merlo, Florence (IT); Pierluigi Tozzi, Florence (IT); Roberto Bardazzi, Florence (IT); Emanuele Checcacci, Florence (IT); Valentina Bisio, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 629 days.

(21) Appl. No.: 16/062,228

(22) PCT Filed: Jan. 26, 2017

(86) PCT No.: PCT/EP2017/051678
§ 371 (c)(1),
(2) Date: Jun. 14, 2018

(87) PCT Pub. No.: WO2017/129696
PCT Pub. Date: Aug. 3, 2017

(65) Prior Publication Data
US 2018/0371750 A1    Dec. 27, 2018

(30) Foreign Application Priority Data

Jan. 29, 2016  (IT) ........................ 102016000009313

(51) Int. Cl.
*E04B 1/82*     (2006.01)
*B32B 5/24*     (2006.01)
*B32B 15/14*    (2006.01)
*E04B 1/86*     (2006.01)

(52) U.S. Cl.
CPC ............ *E04B 1/8218* (2013.01); *B32B 5/245* (2013.01); *B32B 15/14* (2013.01); *E04B 1/86* (2013.01);
(Continued)

(58) Field of Classification Search
CPC ......... E04B 1/8218; E04B 1/86; B32B 5/245; B32B 15/14; B32B 2255/02;
(Continued)

(56) References Cited

U.S. PATENT DOCUMENTS 4,084,367 A * 4/1978 Saylor ................. B29D 24/005
                                                        428/113
5,907,932 A * 6/1999 LeConte ............... E04B 2/7411
                                                        181/210

(Continued)

FOREIGN PATENT DOCUMENTS

CN   204283793 U    4/2015
CN   105965983 A    9/2016
(Continued)

OTHER PUBLICATIONS

Search Report and Written Opinion issued in connection with corresponding IT Application No. 102016000009313 dated Oct. 5, 2016.
(Continued)

*Primary Examiner* — Forrest M Phillips
(74) *Attorney, Agent, or Firm* — Baker Hughes Patent Org

(57) ABSTRACT

A panel for machinery enclosure, particularly for turbomachine enclosures. More specifically, a multilayered panel including several different layers each performing a specific function. In particular, the multilayered panel is capable to provide high levels of jet fire and fire/blast protection together with high performances in term of noise abatement (Continued)

with a lighter structure with respect to the panels of the prior art.

13 Claims, 2 Drawing Sheets

(52) U.S. Cl.
CPC ....... *B32B 2255/02* (2013.01); *B32B 2255/26* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2262/108* (2013.01); *B32B 2266/0221* (2013.01); *B32B 2266/0228* (2013.01); *B32B 2266/0242* (2013.01); *B32B 2266/0278* (2013.01); *B32B 2266/04* (2013.01); *B32B 2307/102* (2013.01); *B32B 2307/304* (2013.01); *B32B 2307/3065* (2013.01); *B32B 2607/00* (2013.01); *F05D 2260/96* (2013.01)

(58) Field of Classification Search
CPC .......... B32B 2255/26; B32B 2260/021; B32B 2260/023; B32B 2260/046; B32B 2262/101; B32B 2262/106; B32B 2262/108; B32B 2266/0221; B32B 2266/0228; B32B 2266/0242; B32B 2266/0278; B32B 2266/04; B32B 2307/102; B32B 2307/304; B32B 2307/3065; B32B 2607/00; F05D 2260/96
USPC ........................................................ 181/290
See application file for complete search history.

(56) References Cited

U.S. PATENT DOCUMENTS

| | | | | |
|---|---|---|---|---|
| 6,112,851 A * | 9/2000 | Sugimoto | ............... | E04C 2/384 181/286 |
| 6,189,649 B1 * | 2/2001 | Nitschke | ............... | E04B 1/8218 181/200 |
| 6,722,466 B1 * | 4/2004 | Tong | ..................... | E04B 1/8218 181/200 |
| 7,467,687 B2 * | 12/2008 | Mitchell | ............... | E04B 1/8218 181/200 |
| 7,604,095 B2 * | 10/2009 | Mitchell | ............... | B63G 13/02 181/210 |
| 9,010,053 B1 * | 4/2015 | Kupferberg | ............... | B32B 7/12 52/309.4 |
| 9,121,175 B2 * | 9/2015 | Fushiki | ................... | B32B 3/266 |
| 10,774,845 B2 * | 9/2020 | Mercer | ................ | G10K 11/161 |
| 2013/0264146 A1 * | 10/2013 | Nason | ....................... | E06B 5/20 181/290 |
| 2016/0333789 A1 * | 11/2016 | Corradini | ................ | F01D 25/24 |

FOREIGN PATENT DOCUMENTS

| | | |
|---|---|---|
| EP | 1 657 374 A2 | 5/2006 |
| EP | 1 862 605 A2 | 12/2007 |
| JP | 2002088721 A | 3/2002 |
| JP | 3084973 U | 4/2002 |
| JP | 2003129427 A | 5/2003 |
| JP | 2006137712 A | 6/2006 |
| JP | 2015010450 A | 1/2015 |
| WO | 2013/184400 A1 | 12/2013 |
| WO | 2015/006433 A2 | 1/2015 |
| WO | 2015006438 A1 | 1/2015 |
| WO | 2015/104504 A1 | 7/2015 |

OTHER PUBLICATIONS

International Search Report and Written Opinion issued in connection with corresponding PCT Application No. PCT/EP2017/051678 dated Apr. 3, 2017.

International Preliminary Report on Patentability issued in connection with corresponding PCT Application No. PCT/EP2017/051678 dated Jul. 31, 2018.

* cited by examiner

MULTILAYERED PANEL FOR MACHINERY ENCLOSURE

BACKGROUND OF THE INVENTION

Embodiments of the invention relate to a panel for machinery enclosure, particularly for turbomachine enclosures.

More specifically, embodiments of the present invention relate to a multilayered panel for turbomachine enclosure.

As it is known, turbomachines are usually housed in a housing structure or enclosure. Said enclosure generally comprises a support structure constituted by a plurality of beams and pillars, said support structure being closed by panels that form lateral walls and the ceiling of the enclosure.

The enclosure is arranged both for the need to reduce the noise emission of the machinery towards the surrounding environment and for the need to control the atmosphere conditions, pressure and temperature, around the machinery and, not least, to avoid foul, dust and in general unwanted substances in the proximity of the machinery.

Moreover, the enclosure is arranged for the need to protect the machinery from the possible development of fire and/or from explosions that can occur in the plant and that may damage the machine itself.

An example of such enclosure 300 is shown in FIG. 1.

Current panels for machine enclosures, in particular for turbomachine enclosures in the oil and gas industry, comprise a steel made structure and an internal rock-wool, or similar material, layer for noise reduction.

Panels for machine enclosures in fact perform multiple functions.

Among these functions, the panels perform a function of acoustic screen, so that the perceived noise outside the enclosure is reduced to desired levels, and/or to noise levels indicated by the reference standards for personnel safety.

Moreover, the panels perform a function of thermal screen being suitable to reduce heat transfer through the enclosure walls.

An example of known panels for machine enclosures is shown in FIG. 2.

With reference to FIGS. 1 and 2, an enclosure 300 for a machinery, particularly for a turbomachine, is currently realized by means of panels 100 comprising a steel sheet 101, an internal noise reducing layer 102, and a perforated sheet 103.

The steel sheet 101 has a supporting function and allows to fix the panel 100 to the supporting structure 200 of the enclosure.

Once the panel is installed, the steel sheet 101 faces the outside of the enclosure, while the perforated sheet 103 faces the internal side of the enclosure.

The noise reducing layer 102 is made of rock-wool or similar materials.

The perforated sheet 103 facing the internal side of the enclosure 300 is perforated in order to allow the sound waves to penetrate inside the panel and to meet the rock-wool layer, which has a sound reducing function.

The steel panel 100 is usually directly bolted to a part of the supporting structure 200 of the enclosure.

The performances of the panel in term of noise reduction are strictly related to the panel thickness, and in particular to the thickness of the noise reducing layer 102, and this implies that higher performances require larger panels, with a weight increase.

Additionally, the traditional enclosure panels of the type of FIG. 2 do not provide high blast and fire protection, and any design change directed to enhance the blast and/or fire protection performances leads to a considerable increase of the weight of the panel itself and of the supporting structure.

The weight of the enclosures is one of the drawbacks afflicting the known solutions. In fact, a high weight of the enclosure is a negative aspect not only in the case of machinery setups, and in particular turbomachinery, on off-shore platforms, but also in the case of in-shore installations.

In fact, the machinery are usually installed on a steel base frame, both for in-shore and off-shore applications. The machinery enclosure can be mounted directly on this base frame which is in turn supported by steel structures or installed on the ground. In alternative, the enclosure can be installed on the platform deck, for off-shore, or directly on the ground by means of foundations in case of in-shore plants.

In case that the machinery, and the enclosure, are mounted on a base plate, by increasing the overall weight of enclosure and machinery increase the static and dynamic loads for which the skid must be designed, leading therefore to an additional weight increase. When the baseplate is supported by the platform deck (off-shore) or by steel structures mounted on ground (in-shore), also the supporting structure will need to be strengthened to withstand this load increase.

In case that the machinery, and the enclosure, are mounted directly on the ground, by increasing the overall weight of enclosure and machinery increases the depth of the excavation necessary for the foundations.

For these reasons, therefore, an increase in the weight of the enclosure is always an unwanted circumstance, since it involves an increase in the costs and in the complexity of the machinery installation.

An additional requirement that the panels for enclosures of machinery must meet, is the resistance to forces caused by an external explosion, called explosion loads.

The improvements in the engineering of the plants, e.g. the possibility to perform more accurate calculation of the pressure wave in case of explosion, lead to always more accurate calculation of the explosion loads to which the enclosure may be subjected in case of explosion in one part of the plant. In addition, the attention to personnel safety and environmental protection has increased rapidly in the latest years leading to always more demanding requirements and therefore it is needed that the panels of the enclosure meet design parameters always more restrictive than in the past in terms of resistance to loads explosives.

Thanks to more accurate techniques of calculation it has been possible to conclude that the metal panels of the known type do not resist to the desired explosives loads values.

Panels for enclosures of the prior art are therefore afflicted by several disadvantages.

Among them, it has already been shown that the high weight of the individual panels of the enclosure is a drawback afflicting the know technic.

Furthermore, limited resistance to explosives loads, namely the bending stresses arising to the panel by the shock wave of an explosion taking place outside the enclosure is another drawback afflicting the prior art panels.

Moreover, the known panels are unsuitable to resist to fire, since the steel sheet 101 facing the external side of the enclosure and the rock wool are not suitable to resist to fire and no special treatments are provided in order to increase such resistance.

Not least, high costs for logistics and assembly of the enclosure deriving from the weight of the panels are a further drawback afflicting the prior art.

Furthermore, the need to realize the panels of stainless steel or other suitable steels capable of resisting to aggressive environments, e.g. in case of installations on offshore platforms in the sea, dramatically increases the costs of the known panels.

SUMMARY OF INVENTION

Embodiments of the present invention concern a panel for machinery, particularly turbomachines enclosure, capable to provide high levels of jet fire and fire/blast protection together with high performances in term of noise abatement with a lighter structure with respect to the panels of the prior art.

More in details, the panel for turbomachines enclosures according to embodiments of the present invention presents, when compared with the technical solution known in the art, increased blast and fire resistance and increased noise abatement.

All these performances are obtained by a panel for enclosures which also presents reduced weight with respect to the prior art.

Additionally, the panel turbomachines enclosures according to embodiments of the present invention presents higher corrosion resistance which renders the panel suitable to be successfully installed also on off-shore platforms with increased reliability and reduced costs.

Embodiments of the present invention are also directed to provide a panel for turbomachine enclosures which requires lean installation and reduced impact on EHS (environmental, health, safety).

BRIEF DESCRIPTION OF THE DRAWINGS

Further details and specific embodiments will refer to the attached drawing, in which.

DETAILED DESCRIPTION

The following description of exemplary embodiments refers to the accompanying drawings. The following detailed description does not limit embodiments of the invention. Instead, the scope of embodiments of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
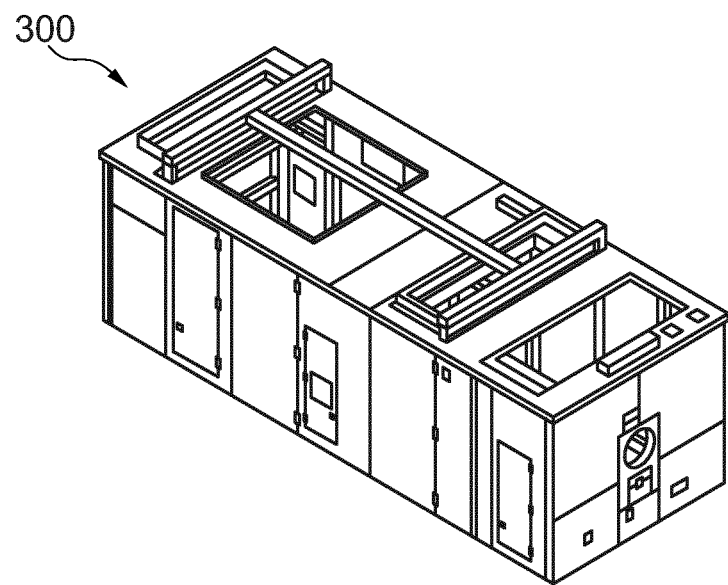
FIG. 1 shows a perspective view of an enclosure for machinery, specifically of an enclosure for a turbomachine.
Figure 2:
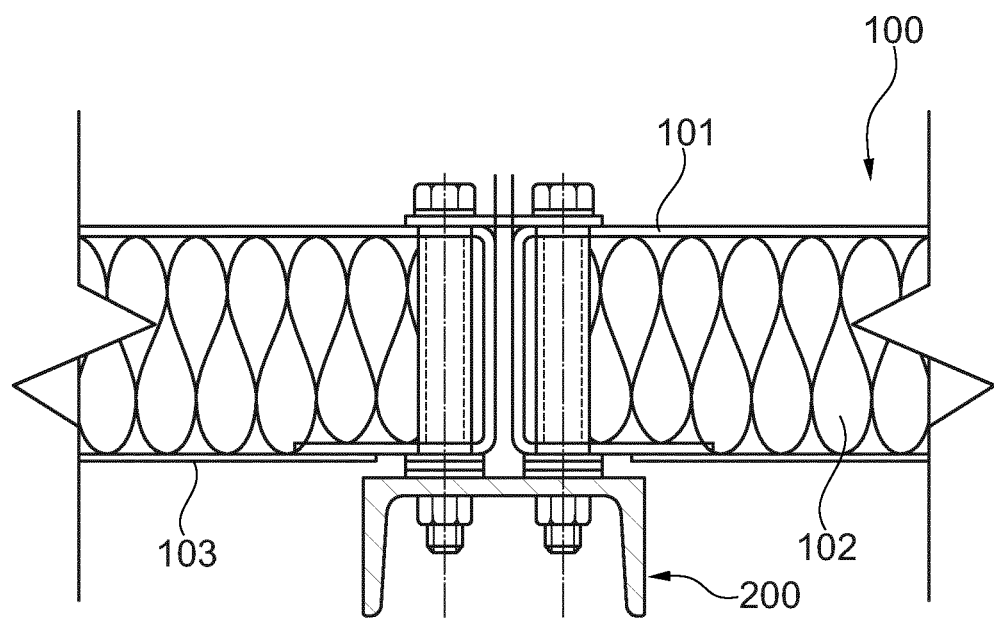
FIG. 2 shows a cross-section view of a panel for enclosure of the known type.
Figure 3:
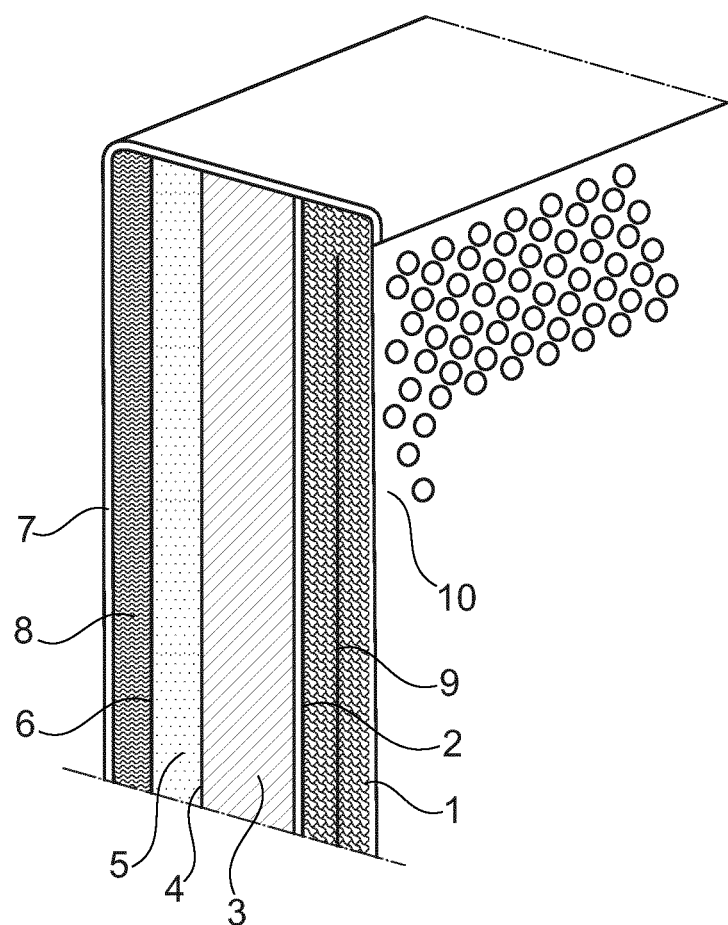
FIG. 3 is a perspective sectional view of the panel for enclosure.

With reference to FIG. 3, the panel for machinery enclosure, in particular for turbomachine enclosure, has a multilayer composite structure comprising discrete layers of different materials each one performing a specific action, thus increasing the overall panel performances.

The layers, substantially parallel to each other, are, in an embodiment, designed and distributed into the whole panel thickness thus providing a reduction of sound transmission from the internal side to the external side of the enclosure walls and, at the same time, protecting the machinery and the equipment housed into the enclosure by blast and fire potentially coming from the surrounding area.

More in detail, the multilayer panel for turbomachine enclosure according to embodiments of the present invention comprises at least a soundproof layer 1, a first structural layer 2 arranged directly onto said soundproof layer 1, a first insulation core layer 3 arranged directly onto the first structural layer 2, and a second structural layer 4 arranged directly onto said first insulation core layer 3, a second insulation layer 5 arranged between structural layer 4 and a third structural layer 6.

The first structural layer 2, the insulation core layer 3 and the second structural layer 4 are grouped together to form a sandwich structure 11.

The sandwich structure 11 can be double comprising a further insulation layer (the second insulation layer 5) and a further structural layer (the third structural layer 6).

The first structural layer 2 is arranged directly onto the soundproof layer 1, thus a first face of the first structural layer 2 adheres to a first face of the soundproof layer 1.

The first insulation core layer 3 is arranged directly onto the first structural layer 2, thus a first face of the first insulation core layer 3 adheres to a second face of first structural layer 2.

The second structural layer 4 is arranged directly onto the first insulation core layer 3, thus a first face of the second structural layer 4 adheres to a second face of first insulation core layer 3.

Attaching together the soundproof layer 1, the first structural layer 2, the first insulation core layer 3 and the second structural layer 4, the overall weight of this assembly is reduced, as well as the thickness, without reducing the structural resistance of the panel.

Said first insulation core layer 3 is, in an embodiment, made of a ceramic insulation core or any other suitable material. Examples of possible materials for said first insulation core layer 3 are: ceramic ($Al_2O_3$, $SiO_2$) foam, phenolic foam, polymethacrylimide (PMI) foam, expanded polystyrene (EPS), extruded polystyrene (XPS) or rigid polyurethane foam.

According to an embodiment of the invention, said soundproof layer 1 is both a thermal and noise insulation layer.

Even if materials suitable to realize a noise reduction function are already known in the field, in an embodiment, said noise insulation layer may be made of rock-wool or of any other mineral wool insulation material.

According to embodiments of the invention, the structural function is provided by the first 2, the second 4 and the third 6 structural layers, which, in an embodiment, are laminated layers made of composite material comprising fiberglass or other suitable materials. Examples of possible resins for said composite material are: Orthopthalic Resin, Isopthalic Resin, Bisphenolic Resin, Therephtalic resin, Vinyl ester Resin, Epoxy resin, Fire Retardant Resin. Examples of possible fibers for said composite material are: Glass fibers, Carbon fibers, Aramid fibers.

The multilayer panel according to embodiments of the present invention further comprises a perforated sheet 10 arranged onto said first soundproof layer 1 on the opposite face of said soundproof layer 1 with respect to the first structural layer 2.

Additionally, in order to increase the fire and blast protection performances of the panel according to embodiments of the present invention it further comprises an ablative layer 8 arranged onto the third structural layer 6.

In an embodiment, said ablative layer 8 is arranged onto the third structural layer 6 on the opposite face with respect to the insulation core layer 5. The ablative layer 8 is arranged externally with respect to the other layers because it's the sacrificial layer in case of fire.

Examples of possible materials for said ablative layer 8 are: fire resistant coatings, fire resistant gelcoat, fireproof paints, ceramic insulation paints, geopolymers and ablative elastomers.

In an embodiment, in order to protect the layers of the multilayer panel of embodiments of the present invention, and in particular for protecting the last layer facing the hazardous, external, side of the enclosure once the panel is installed, i.e. the third structural layer 6 or the ablative layer 8 if provided, a protective layer 7 is further provided.

In an embodiment, said protective layer 7 is made of resin, more particularly, it is made of gel coat or any other suitable material, and is arranged onto said third structural layer or onto said ablative layer 8 if provided.

Examples of possible materials for said protective layer 7 are: fire resistant coatings, fire resistant gelcoat, fireproof paints, ceramic insulation paints, geopolymers, intumescent paint, ablative elastomer.

According to an embodiment of the present invention shown in FIG. 3, the ablative layer 8 is arranged between the protective layer 7 and the third structural layer 6.

The multilayer panel according to embodiments of the invention further comprises a second insulation core layer 5.

More particularly, said second insulation layer 5 is arranged in an intermediate position between the second 4 structural layer and third structural layer 6.

According to an embodiment of the present invention, said first 2, second 4, and third 6 structural layers are made of a composite material, more particularly composite material comprising fiberglass.

According to an embodiment of the present invention, said first soundproof layer 1 further comprises an additional laminate layer 9.

More particularly, said laminate layer 9 is made of metallic material, in order to provide a further noise reduction absorbing sound waves having a different wave length with respect to the one absorbed by the first soundproof layer 1 into which it is inserted.

More particularly, said laminate layer 9 is not rigidly fixed but is floating inside the panel.

The layers of the multilayer panel can be glued each other.

According to an embodiment of the present invention, the multilayer panel has an overall thickness comprised between 50 mm and 150 mm.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multilayer panel for turbomachine enclosure comprising:
    a soundproof layer;
    a first structural layer arranged directly onto the soundproof layer;
    an insulation core layer arranged directly onto the first structural layer;
    a second structural layer arranged directly onto the insulation core layer; and
    a perforated layer arranged onto the soundproof layer on the opposite face of the soundproof layer with respect to the first structural layer,
    wherein the soundproof layer further comprises an additional laminate layer floating thereinside;
    an external protective layer provided at the opposite face of the multilayer panel with respect to the first soundproof layer or to the perforated layer, wherein the first soundproof layer comprises an additional laminate layer floating thereinside.

2. The multilayer panel according to claim 1, further comprising an external protective layer provided at the opposite face of the panel with respect to the soundproof layer or to the perforated layer.

3. The multilayer panel according to claim 1, further comprising:
    a second insulation core layer arranged onto the structural layer;
    a third structural layer arranged onto the insulation core layer.

4. The multilayer panel according to claim 3, further comprising an ablative layer arranged onto the third structural layer.

5. The multilayer panel according to claim 4, wherein the ablative layer is arranged between the protective layer and the third structural layer, the ablative layer being in direct contact with the protective layer and the third structural layer.

6. The multilayer panel according to claim 1, wherein the additional laminate layer is made of metallic material.

7. The multilayer panel according to claim 1, wherein the soundproof layer comprises rock wool.

8. The multilayer panel according to claim 1, wherein the protective layer comprises a gel coat.

9. The multilayer panel according to claim 1, wherein one or more of the first, the second, and the third structural layers are made of a composite material.

10. The multilayer panel according to claim 1, wherein the insulation core layer comprising ceramic or polymeric foam.

11. The multilayer panel according to claim 1, wherein the ablative layer comprises a fire resistant coating.

12. The multilayer panel according to claim 1, wherein the overall thickness of the panel is between 50 mm and 150 mm.

13. A turbomachine enclosure comprising multilayer panels according to claim 1.

* * * * *